(12) United States Patent
Xu et al.

(10) Patent No.: US 11,501,056 B2
(45) Date of Patent: Nov. 15, 2022

(54) DOCUMENT REFERENCE AND REFERENCE UPDATE

(71) Applicant: INTERNATIONAL BUSINESS MACHINES CORPORATION, Armonk, NY (US)

(72) Inventors: Ya Ling Xu, Beijing (CN); Xiao Yin Zhou, Beijing (CN); Zhenni Yan, Beijing (CN); Xin Peng Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 16/938,351

(22) Filed: Jul. 24, 2020

(65) Prior Publication Data

US 2022/0027553 A1    Jan. 27, 2022

(51) Int. Cl.
| G06F 40/134 | (2020.01) |
| G06F 40/117 | (2020.01) |
| G06F 16/13 | (2019.01) |
| G06F 40/131 | (2020.01) |
| G06F 40/146 | (2020.01) |
| G06F 40/157 | (2020.01) |

(52) U.S. Cl.
CPC .......... *G06F 40/134* (2020.01); *G06F 16/137* (2019.01); *G06F 40/117* (2020.01); *G06F 40/131* (2020.01); *G06F 40/146* (2020.01); *G06F 40/157* (2020.01)

(58) Field of Classification Search
CPC .............................. G06F 40/134; G06F 40/131
See application file for complete search history.

(56) References Cited

U.S. PATENT DOCUMENTS 5,428,777 A * 6/1995 Perliski ................ G06Q 10/109
5,978,818 A * 11/1999 Lin ....................... G06F 40/134
                                                                  715/209

(Continued)

FOREIGN PATENT DOCUMENTS

| CN | 100449500 C | 1/2009 |
| WO | 2010082207 A9 | 6/2012 |

OTHER PUBLICATIONS

Mell et al., "The NIST Definition of Cloud Computing", National Institute of Standards and Technology, Special Publication 800-145, Sep. 2011, 7 pages.

*Primary Examiner* — Benjamin Smith
(74) *Attorney, Agent, or Firm* — Caleb D. Wilkes

(57) ABSTRACT

A method, computer system, and a computer program product may perform document reference and reference update. One or more processors may assign marker information for a reference of a reference source. The reference may reference a target portion of a target document. The one or more processors may determine identification information for the target portion. The determined identification information may be based on content in the target portion and context information for the target portion in the target document. The one or more processors may generate a mapping of at least the marker information, the identification information, and a relative location of the target portion within the target document for use in the referencing of the target portion by the reference source.

20 Claims, 11 Drawing Sheets

(56) References Cited

U.S. PATENT DOCUMENTS

| | | | |
|---|---|---|---|
| 6,606,653 B1 | 8/2003 | Ackermann, Jr. | |
| 6,769,096 B1* | 7/2004 | Kuppusamy | G06F 16/94 |
| | | | 707/999.01 |
| 7,254,570 B2* | 8/2007 | Stickler | G06F 16/93 |
| 7,392,303 B2 | 6/2008 | Smith | |
| 7,533,335 B1* | 5/2009 | Sawicki | G06F 40/117 |
| | | | 715/239 |
| 8,006,194 B2* | 8/2011 | Berger | G06F 3/0486 |
| | | | 715/770 |
| 8,091,020 B2* | 1/2012 | Kuppusamy | G06F 16/94 |
| | | | 715/240 |
| 8,190,850 B1 | 5/2012 | Davenport | |
| 8,423,624 B2 | 4/2013 | Astle | |
| 9,098,471 B2* | 8/2015 | Richardson | G06F 40/10 |
| 9,356,574 B2* | 5/2016 | Denninghoff | H03H 9/1092 |
| 9,549,035 B2 | 1/2017 | Duncan | |
| 9,830,319 B1* | 11/2017 | Tortosa | G06F 16/86 |
| 10,331,761 B2* | 6/2019 | Schoedl | G06F 17/00 |
| 2003/0105746 A1* | 6/2003 | Stickler | G06F 16/93 |
| 2003/0122874 A1* | 7/2003 | Dieberger | G06F 16/904 |
| | | | 715/764 |
| 2005/0010865 A1* | 1/2005 | Kuppusamy | G06F 16/94 |
| | | | 715/205 |
| 2005/0228818 A1* | 10/2005 | Murthy | G06F 40/143 |
| 2007/0027936 A1 | 2/2007 | Stakutis | |
| 2007/0156745 A1* | 7/2007 | Harrington | G06F 40/131 |
| 2008/0082554 A1* | 4/2008 | Pedersen | G06F 16/93 |
| 2008/0091693 A1* | 4/2008 | Murthy | G06F 16/94 |
| 2009/0044121 A1* | 2/2009 | Berger | G06F 3/0486 |
| | | | 715/724 |
| 2009/0276693 A1* | 11/2009 | Miyamoto | G06F 40/258 |
| | | | 715/234 |
| 2010/0275117 A1* | 10/2010 | Vion-Dury | G06F 16/9558 |
| | | | 715/234 |
| 2011/0179350 A1 | 7/2011 | Capela | |
| 2011/0191672 A1* | 8/2011 | Schodl | G06F 40/10 |
| | | | 715/256 |
| 2012/0284344 A1* | 11/2012 | Costenaro | G06F 40/197 |
| | | | 709/206 |
| 2013/0174017 A1* | 7/2013 | Richardson | G06F 40/10 |
| | | | 715/234 |
| 2014/0033046 A1* | 1/2014 | Walsh | G06F 40/131 |
| | | | 715/730 |
| 2014/0046949 A1* | 2/2014 | Bloomfield | G06F 16/93 |
| | | | 707/741 |
| 2014/0317481 A1* | 10/2014 | Sawada | G06F 40/114 |
| | | | 715/202 |
| 2015/0067477 A1* | 3/2015 | Whetsell | G06F 40/131 |
| | | | 715/234 |
| 2016/0026731 A1* | 1/2016 | Murthy | G06F 16/94 |
| | | | 707/694 |
| 2017/0010773 A1* | 1/2017 | Curcelli | G06F 3/0483 |
| 2019/0286726 A1* | 9/2019 | Labian | G06F 16/2272 |
| 2019/0311023 A1* | 10/2019 | Griessbaum | G06F 40/169 |

* cited by examiner

| MARKER INFO. | INDEX HIERARCHY | IDENTIFIER | CONTENT | CONTENT HASH VALUE | CONTEXT HASH VALUE | RELATIVE LOCATION |
|---|---|---|---|---|---|---|
| Security_TermtList | V. Comprehensive solutions for security / 77<br>(1) Solutions for Regions / 78<br>4 Conclusion / 105<br>1) Terms and abbreviations / 105 | Table 1. Terms and definitions | Terms\n definitions\n authentication\n The process of proving an individual is a claimed identity. Authentication is the first element of the AAA services concept, which includes Authentication, Authorization, and Accounting. . . | 646CB0D5AF7F8E9A4 B58BCF53608DC47 | #A#646CB0D5AF 7F8E218B58BC F53608DCA8#B#3 9AFE7D5DFF2 78387645176F154 84A02 | PAGE 105;<br>OFFSET:<br>{<br>x: 200,<br>y:-10<br>} |
| Security_1L_Com ment | V. Comprehensive solutions for security / 77<br>(1) Solutions for Regions / 78<br>4 Conclusion / 105<br>1) Terms and abbreviations / 105 | [Annotation]* Help information | Note: Whether you're embarking on a cybersecurity journey by understanding essential defensive methods or expanding to product-specific training, we have courses to help you..... | 4543ABC9DE7F8E9A 4B58BCF53608A99 | #C#6579CD0D5A F7F8218B58BC F73609DCA6#D#5 9CFB7D5DEF5 76889645176F137 84A02 | PAGE 105;<br>OFFSET:<br>{<br>x: 200,<br>y:-30<br>} |
| ... | ... | ... | ... | ... | ... | ... |
| Security_Section_ V.1.4.1 | V. Comprehensive solutions for security / 77<br>(1) Solutions for Regions / 78<br>4 Conclusion / 105<br>1) Terms and abbreviations / 105 | [Title of section]* 4 Conclusion | 4 Conclusion\n 1) Terms and abberations | 4543ABC9DE7F8E9A 4B58BCF53608A99 | #C#6579CD0D5A F7F8218B58BC F73609DCA6#D#5 9CFB7D5DEF5 76889645176F137 84A02 | PAGE 105;<br>OFFSET:<br>{<br>x: 0,<br>y:0<br>} |

FIG. 7

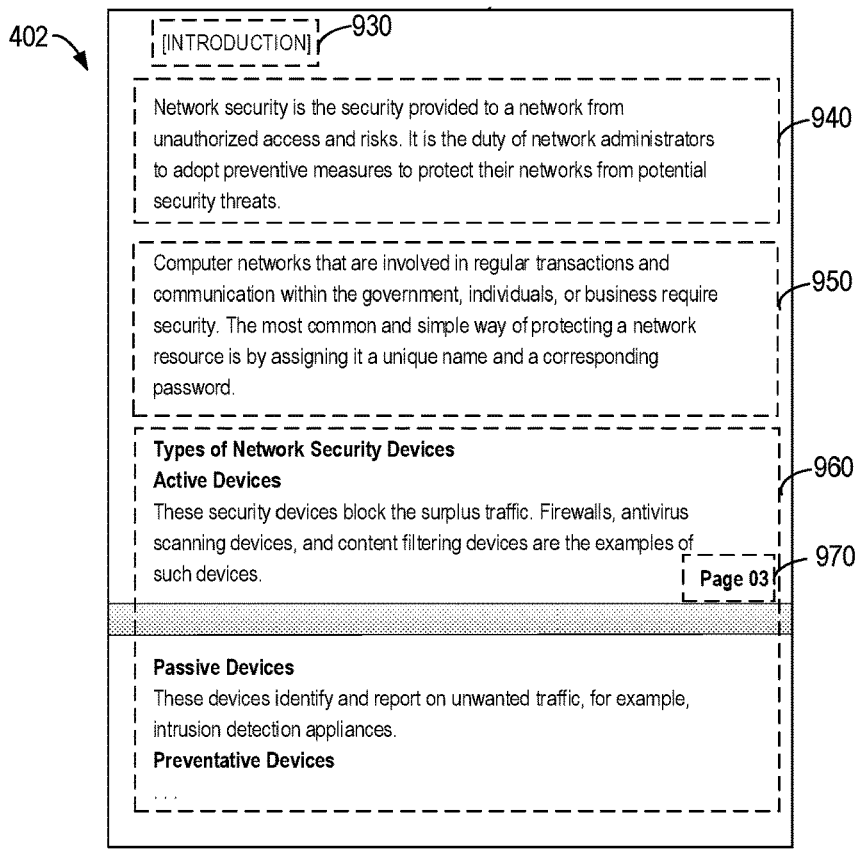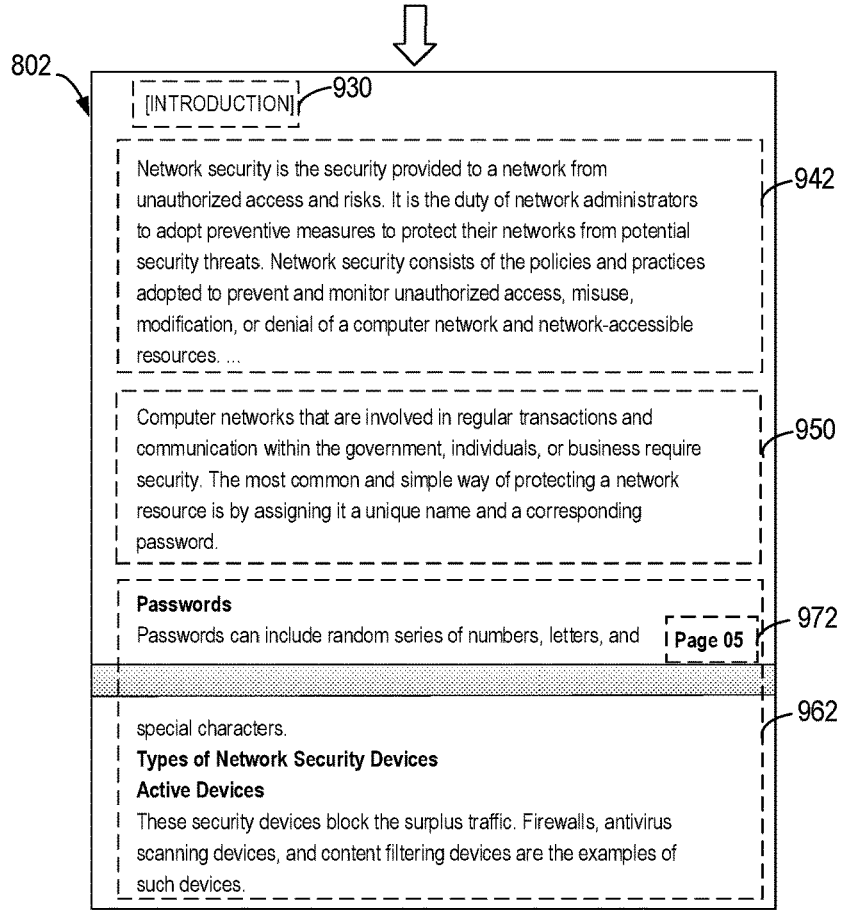
FIG. 9B

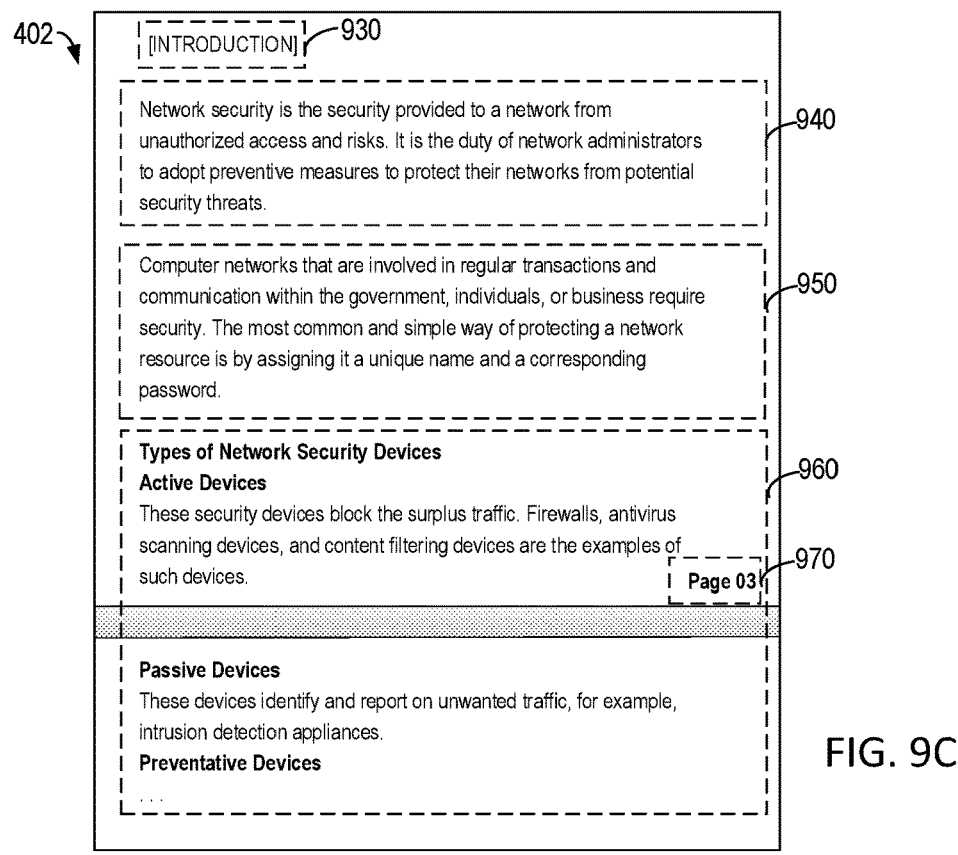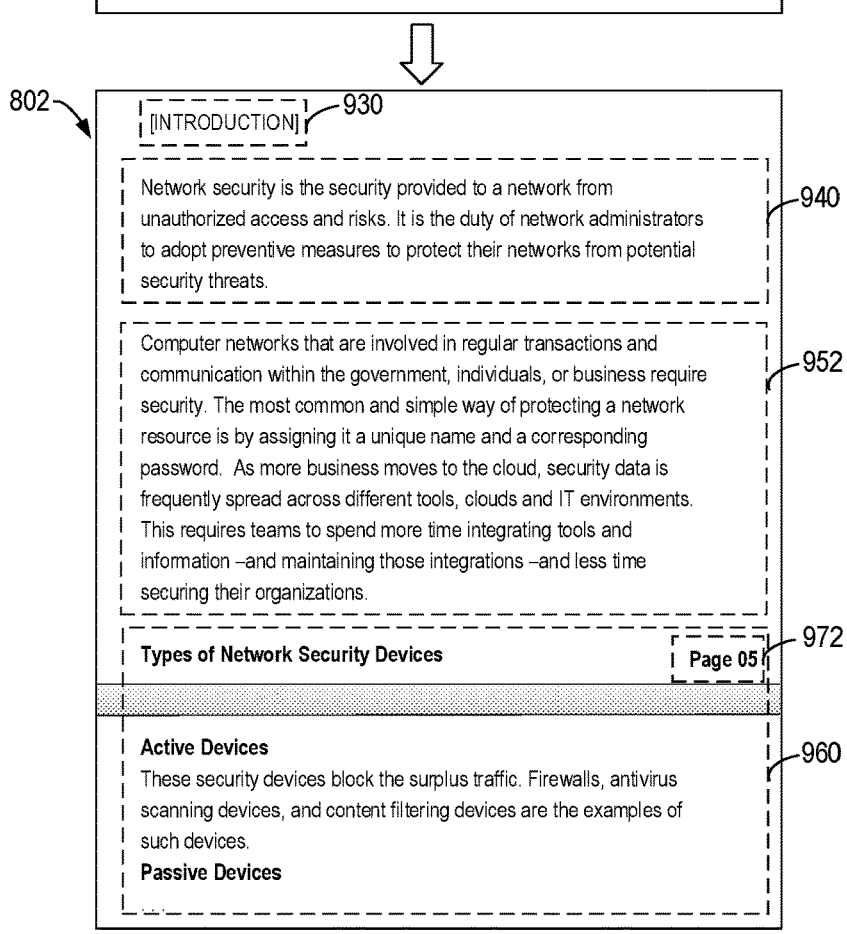
FIG. 9C

DOCUMENT REFERENCE AND REFERENCE UPDATE

BACKGROUND

The present invention relates to computer techniques, and more specifically, to a method, system, and computer program product for document reference and reference update.

Various sources (e.g., research papers, web pages, application pages, and other types of documents) may include references to specific sections within documents. Such sources may be referred to as reference sources. The document references inform readers of the underlying reference sources for the subject matter included in the sources. Links or "hyperlinks" can be created by the author of the reference source to allow readers to jump to locations of specific portions of a document in various orders based on the readers' interests.

SUMMARY

Embodiments of the present invention include a method, a computer system, and a computer program product for document reference and reference update. The present invention may include one or more processors assigning marker information for a reference of a reference source. The reference may reference a target portion of a target document. The one or more processors may determine identification information for the target portion. The determined identification information may be based on content in the target portion and context information for the target portion in the target document. For use in the referencing of the target portion by the reference source, the one or more processors may generate a mapping of at least the marker information, the identification information, and a relative location of the target portion within the target document.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference character generally refers to the same components in the various embodiments of the present invention.

FIG. 7 depicts example mappings in a table according to some embodiments of the present disclosure.

FIG. 9B depicts an example of a change in a relative location of a target portion in a target document according to some embodiments of the present disclosure.

FIG. 9C depicts another example of a change in a relative location of a target portion in a target document according to some embodiments of the present disclosure.

DETAILED DESCRIPTION

Figure 1:
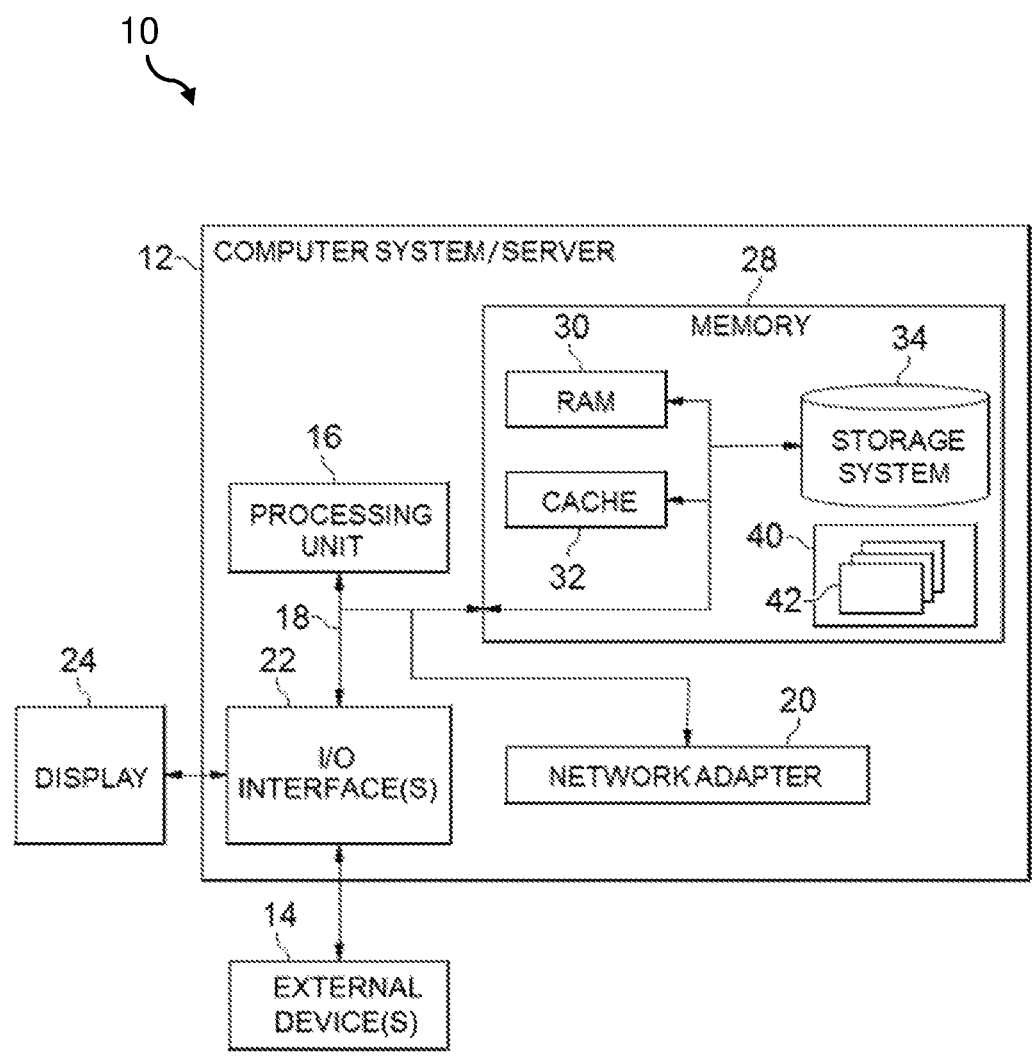
FIG. 1 depicts a cloud computing node according to some embodiments of the present disclosure.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may also include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
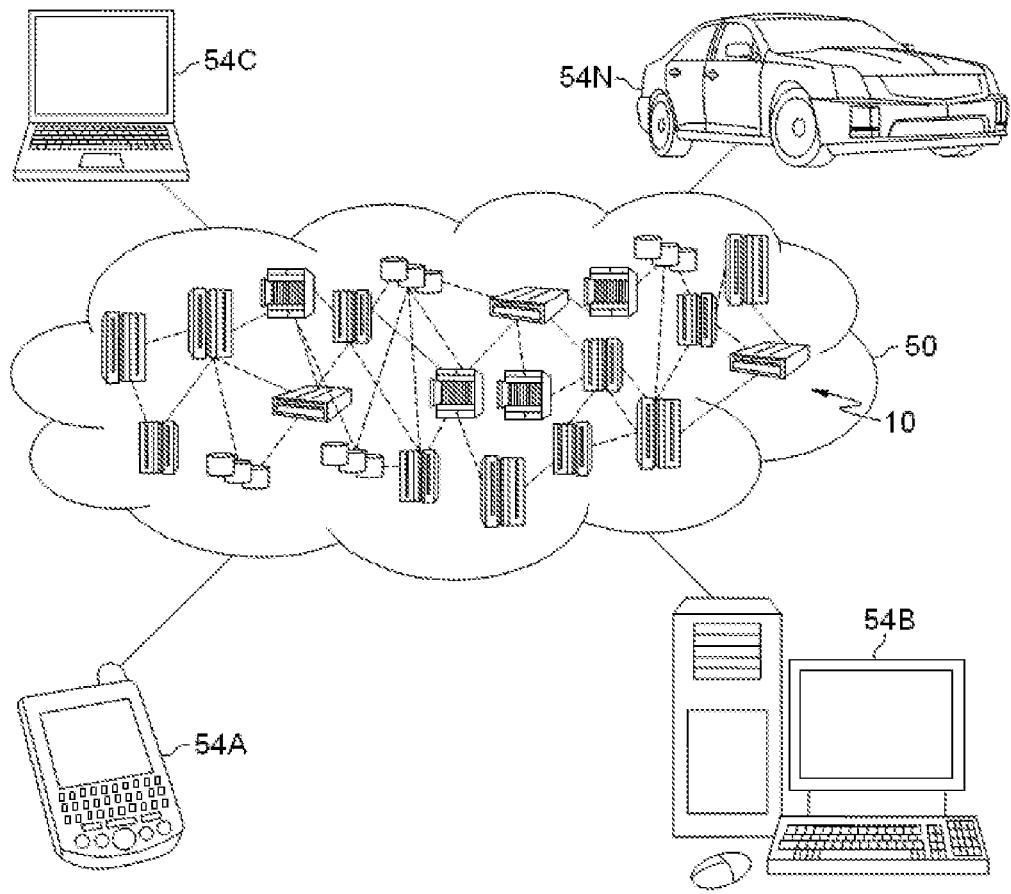
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
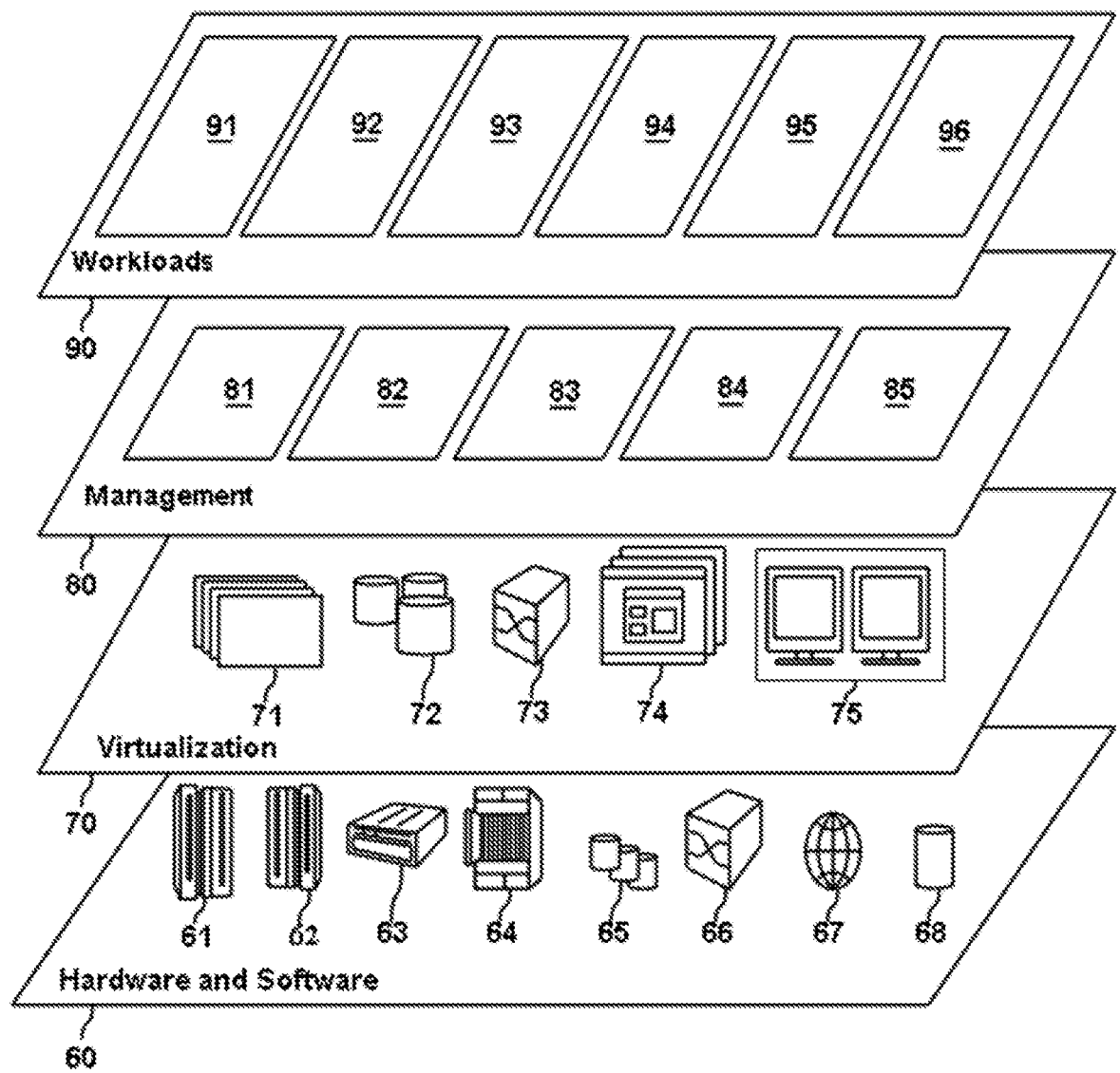
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document reference and reference update 96. The functionalities of document reference and reference update will be described in the following embodiments of the present disclosure.

It is desirable that a reference in a reference source that refers to a specific portion of a document be linked to the correct location if the document is updated. Currently, links or hyperlinks to specific portions of a document are defined by page numbers and sometimes offsets of the portions within the pages. If a referenced document, e.g., a target document, is updated, for example, if additions, deletions, or adjustments are made to the document content, the page numbers of the referenced portions may be changed. In some cases, the referenced document is provided by a third party. If the third party controls the reference document, it may be impossible to add any annotations to the document to enable synchronous updates between the document and the links in the reference sources. The previous links or hyperlinks become invalid or may link to an incorrect location due to the changes of the locations of the referenced document portions.

Traditionally, the author is required to check and update the links accordingly to make sure that the links are still directed to the correct locations in the updated document. Keeping the links always in synchronization with the document may involve intensive manual review. Sometimes accuracy may be compromised because of human errors.

In accordance with various embodiments of the present disclosure, a solution is provided for document reference to facilitate reference update. According to some embodiments, a separate mapping may be created for use in referencing a certain portion of a document. Specifically, marker information is assigned to the target portion to be referenced in the document (referred to as a "target portion" of a "target document"). The marker information is used for mapping a reference of a reference source that references the target portion. Identification information is determined for the target portion based on content in the target portion and based on context information for the target portion in the target document. Accordingly, the identification information may change as the content and/or context information of the target portion change, while the marker information may not change. A mapping of at least the marker information, the identification information, and a relative location of the target portion within the target document is generated for use in the referencing of the target portion of the target document performed by the reference source.

Through this solution, references to specific portions of a document can be achieved easily via the generated mapping. In addition, with the separate mapping, the references can be automatically updated with reduced effort, for example, by changing the updated locations of the referenced portions without changing the corresponding marker information. This reference update in some embodiments of the invention achieves correct source referencing in a quickly-changing information world, which provides substantial advantages in accuracy and in speed compared to conventional computer technology and conventional word-processing technology. An updated mapping in an embodiment may be automatically introduced into the reference or accessed by the reference to correct the reference or to correct a link of the reference.

Other advantages of the present disclosure will be described with reference to the example embodiments and the accompanying drawings below. Although the embodiments are described using "document," the document in the described embodiments can also be referred to as an electronic document, which includes any type of file or any portion of the file that can include text and/or other type of content. Such document can be stored in any location, such as in an on-line server, a local or remote memory/storage device, a file system, and/or the like. Examples of the document may include, but are not limited to, a word processor document, a PDF file, a presentation file, a spreadsheet, a web page, an application page, a bitmap image, an architectural drawing, an image file, and the like.

Figure 4:
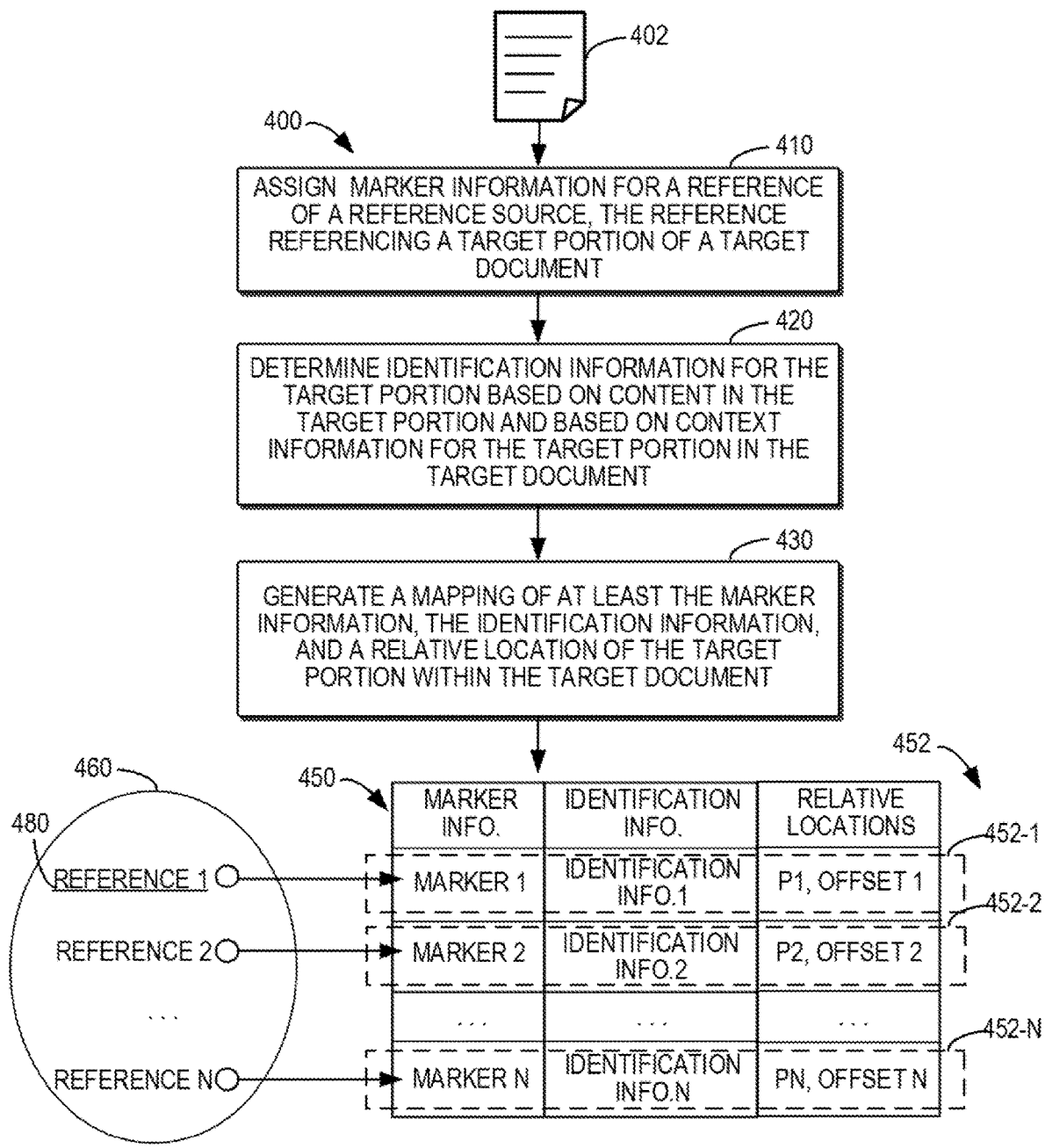
FIG. 4 depicts a flowchart of a process for document reference according to some embodiments of the present disclosure.

Reference is now made to FIG. 4, which illustrates a flowchart of an example process 400 according to some embodiments of the present disclosure. The process 400 can be implemented by any computer system, such as the computer system/server 12 discussed above with reference to FIG. 1, to implement document reference. For the purpose of discussion, the process 400 will be described with reference to FIG. 1.

Through the process 400, the computer system/server 12 generates one or more mappings of marker information, identification information, and relative locations of one or more specific portions of a target document 402, for use in referencing the specific portions. Those specific portions of the target document 402 are to be referenced from one or more reference sources. In an example, a reference source may be a document such as a web page, a word processor document, a PDF file, a presentation file, a spreadsheet, an application page, a bitmap image, an architectural drawing, or an image file. Other examples of the reference source may include a document editing/management system, a software application, a website, and any other source that consumes or makes use of the target document 402.

In some embodiments, the reference source may reference more than one portion of the target document 402. It is to be noted that for the purpose of discussion, the process 400 is described as generating a mapping for use in referencing one portion of the target document 402. The mappings for any other portions of the target document 402 may also be generated in a similar manner. As shown in FIG. 4, a collection of mappings 452-1, 452-2, . . . , 452-N can be determined for respective N portions of the target document 402, where N is an integer larger than or equal to one. For ease of discussion, the mappings 452-1, 452-2, . . . , 452-N are collectively or individually referred to as mappings 452.

Specifically, at block 410 of the process 400, the computer system/server 12 assigns marker information for a reference of a reference source 460. The reference references, e.g., refers to, a target portion of the target document 402.

The target portion may be any segment of the target document 402 that is referenced from the reference source. Such target portion may be specified or marked by an author or a user of the reference source and may include content of any size that is contained in the target document 402. For example, the target portion may be a chapter, a section, a page, a portion of a page, an image, a table, or any other content of another size that is contained in the document 402. The target portion can also be referred to as a document fragment, so that the method includes external document content fragment referencing through a virtual layer, e.g., through the mapping.

According to the embodiments of the present invention, the marker information for the target portion may be directly assigned instead of being determined based on content or instead of being based on a relative location of the target portion or the target document 402. In some embodiments, the marker information may be static. As used herein, the term "static" means that the marker information does not change as the target portion or the target document 402 is updated. As will be discussed in detail below, a reference that is in the reference source and that references the target portion can be mapped to the marker information in order to refer to the target portion. The reference may be defined based on the static marker information, and thus will not need to be redefined if a relative location of the target portion is changed.

The marker information may be any information that can be used to mark the target portion. For example, the marker information may be a character string. In some embodiments, if more than one target portion of the target document 402 is specified to be referenced from one or more reference sources, the marker information for a current target portion may be a unique identifier so as to differentiate from the static marker information for any other target portion of the target document 402.

At block 420, the computer system/server 12 determines identification information for the target portion based on content in the target portion and based on context information for the target portion in the target document. The identification information is determined in order to facilitate localizing of the target portion if a change of the target document is detected. The identification information helps track possible updates or changes made to the target portion. The identification information may be used to clip the target portion in the target document.

The context information of the target portion may be used to identify a context for the target portion. In some embodiments, the context information that is determined may be content in a preceding portion and/or content in a subsequent portion relative to the target portion in the target document 402. The preceding portion and the subsequent portion may be determined to have a same predetermined size or different predetermined sizes. Thus, content of the predetermined portion(s) preceding or following the target portion may be used to localize the target portion in the target document 402.

Figure 5:
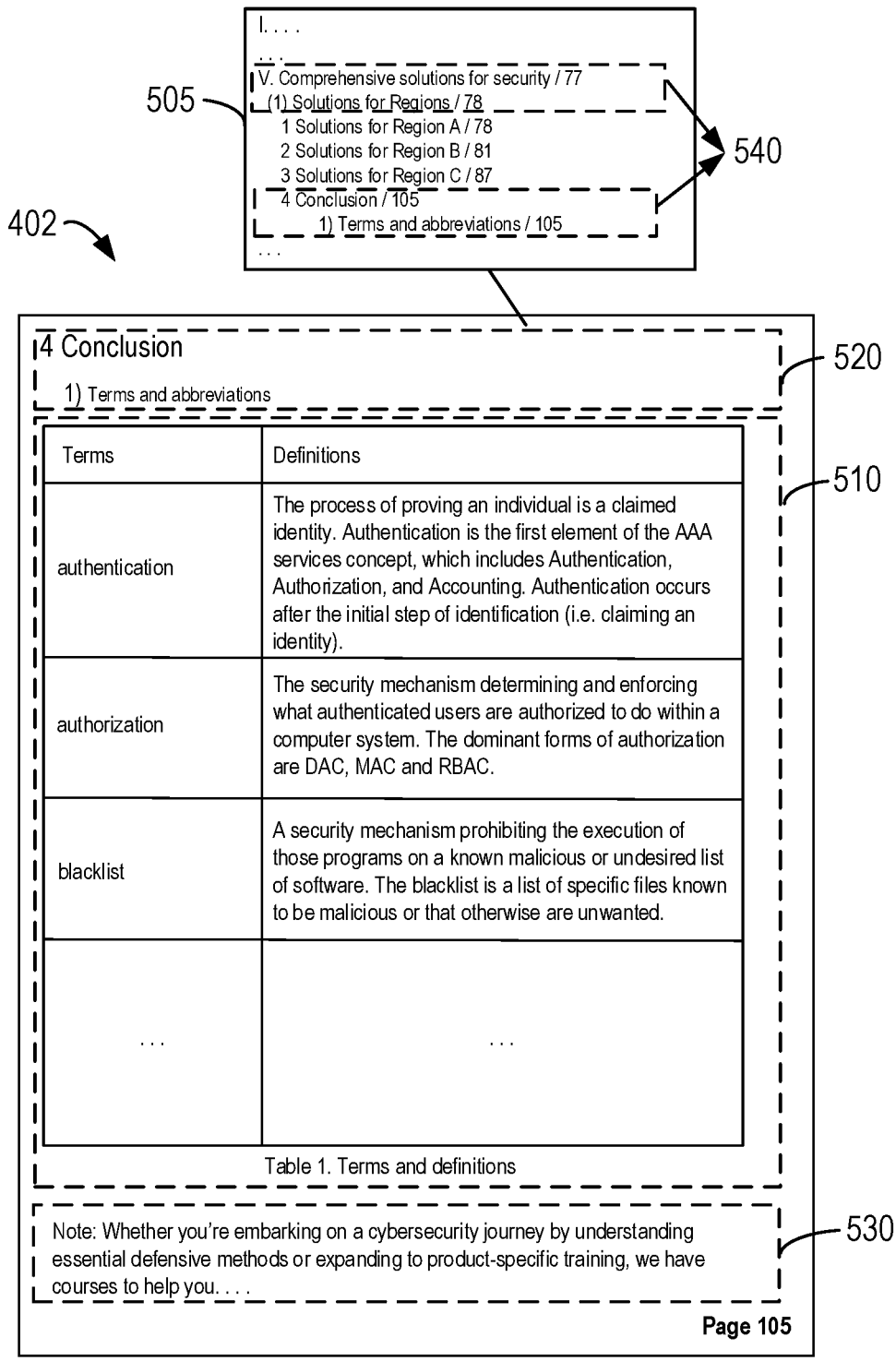
FIG. 5 depicts an example document with portions to be referenced according to some embodiments of the present disclosure.

The identification information may include various types of information determined from the content in the target portion and from the context information for the target portion. To better understand how the identification information is determined and is used to track the target portion, an example page of the target document 402 is illustrated in FIG. 5. In this example, a target portion 510, which includes a table, is to be referenced by the reference source. The context information for the target portion 510 may include a title of the section where the table is located. The title may be in a portion 520 that precedes the target portion 510. In other words, the portion 520 is a preceding portion. The context information for the target portion 510 may additionally or alternatively include annotations in a portion 530 that is subsequent to the target portion 510. In other words, the portion 530 is a subsequent portion.

In some embodiments, according to the content contained in the target portion, the computer system/server 12 may determine an identifier of the target portion to uniquely identify the target portion in the target document 402. The identifier may be determined according to a predefined rule.

For example, if the target portion corresponds to or includes a special content object in the target document, such as a table, an image, a chart, an annotation, or any other type of object inserted in the document, the identifier of the target portion may identify at least the type of the content object and the number of the content object if more than one content object of the same type are in the target document. In the example of FIG. 5 where the target portion 510 is a table, its identifier may be "Table" plus the number of the table, such as "Table 1." In some embodiments, if the title or name of the content object is presented in the target document, the existing title or name may also be included as the identifier. For example, the identifier of the target portion 510 in FIG. 5 may be determined as "Table 1. Terms and definitions" to specifically indicate the title of the table.

In some embodiments, if the target portion corresponds to a specific paragraph or to a range of paragraphs, the identifier of the target portion may identify the paragraph and a small part of the content in the target portion. For example, the identifier of the target portion may be selected as "Paragraph" plus the first sentence or the last sentence of the paragraph. In some examples, if paragraphs in the target document 402 are specifically numbered, the identifier of the target portion may be the number of the paragraph or a range of numbers corresponding to the range of paragraphs.

In some embodiments, in addition or as an alternative to the identifier of the target portion, the identification information for the target portion may include a content hash value determined from a part or all of the content contained in the target portion. Any suitable hash function may be applied to calculate the content hash value. In an embodiment, a predetermined amount of content is extracted from the target portion to determine the content hash value. The predetermined amount may be determined as having any suitable value. In an embodiment, if content in the target portion or the predetermined amount of the content includes textual information such as a table, a title, or plain text, the textual information may be extracted and used to calculate the content hash value. If the content or the predetermined amount of the content includes non-textual information such as an image or a chart, a binary representation of the non-textual information may alternatively or additionally be extracted to calculate the content hash value.

In some embodiments, in addition to the identifier of the target portion and the content hash value, or as an alternative, at least a part of the content contained in the target portion may be directly copied from the target document 402 and used as a part of the identification information for the target portion. In an embodiment, a predetermined amount of content in the target portion is used as a part of the identification information. The amount may have any suitable value, which may or may not be the same as the content amount for calculating the content hash value. In an embodiment, if content in the target portion or the predetermined amount or size of the content includes a table, a title, or plain text, the textual information may be extracted and used to calculate the content hash value. In some embodiments, either textual information or a binary representation of non-textual information contained in the target portion may be copied and set as a part of the identification information.

In addition to the content contained in the target portion, the context information may also be used to determine the identification information for the target portion. In some embodiments, the identification information for the target portion may include a context hash value determined from at least a part of the context information contained in the target document 402, such as content in a preceding portion and/or a subsequent portion relative to the target portion. Any suitable hash function may be applied to calculate the context hash value. In an embodiment, a predetermined amount of content in the preceding portion and/or the subsequent portion is used to determine the context hash value. The amount may have any suitable value, which may or may not be the same as the value of the content amount for calculating the content hash value. Similarly as for the content hash value, textual information and/or a binary representation of non-textual information contained in the preceding portion and/or the subsequent portion can be used to determine the context hash value.

Although several possible types of identification information determined from the content of the target portion have been discussed above, the computer system/server 12 may generate one or more of the types of identification information and one or more other types may be omitted, such as the content of a predetermined size/amount or the identifier of the target portion.

With the marker information assigned and the identification information determined, at block 430 the computer system/server 12 generates a mapping 452 of at least the marker information, the identification information, and a relative location of the target portion within the target document 402. The mapping 452 is generated for the reference source 460 to use in referencing the target portion of the target document 402.

In order to reference the target portion, the relative location that is part of the mapping 452 is used to localize the target portion in the target document 402. The relative location of the target portion may be determined in any suitable manner to localize the target portion from the target document 402. In some embodiments, the relative location of the target portion may be indicated by an anchor page number of the target portion such as the number of a page where the target portion is, by a number of a beginning page if the target portion extends across several pages, or by a page range if the target portion extends across several pages. To localize the target portion more precisely, the relative location may be further indicated by an offset at a beginning page where the target portion is. The offset may be a paragraph offset, a line offset, a character offset, or another suitable offset represented in other units.

In some embodiments, the mapping of the marker information, the identification information, and the relative location of the target portion may be generated by creating a table and generating an entry in the table to indicate the marker information, the identification information, and the relative location. As shown in FIG. 4, a mapping 452-1 that includes "Marker 1," "Identification Info.1," and a relative location of "{1, Offset 1}" is generated as an entry of a table 450. The three elements in the entry are considered as being associated with each other.

If there is one or more other target portions of the target document 402 to be referenced from the reference source(s), respective mappings of marker information, identification information, and relative location of the other target portions may be generated similarly according to the process 400. FIG. 4 further illustrates a mapping 452-2 that includes "Marker 2," "Identification Info.2," and a relative location of "{P2, Offset 2}," and a mapping 452-N that includes "Marker N," "Identification Info.N," and a relative location of "{PN, Offset N}" that are generated as additional entries in the table 450. In some examples, the table 450 that includes the collection of the mappings may sometimes be referred to as a virtual marker table. Although a structure of a table is illustrated in FIG. 4, a mapping or a collection of mappings may be generated in any other suitable structures.

In some embodiments, if content of the target document is organized well with specific topics organized in a hierarchy structure, such hierarchy structure may also be used along with the identification information to better facilitate localizing the target portion if a change of the target document is detected. According to specific reference logic within a document, the document may be divided into one or more parts, a part may include one or more chapters, a chapter may include one or more sections, a section may include one or more sub-sections, and so on.

For the purpose of discussion, a general term "sections" is used herein to indicate different divisions of topics in the target document 402. The sections in the target document 402 may be organized in a catalogue hierarchy, such as a tree structure. The target portion of the target document 402 may be in a section of the target document or may be equivalent to a section of the target document. In such cases, the specific hierarchy level of the target portion may also help facilitate a localization of the target portion in the target document and may be included in the mapping 452 for the target portion.

Accordingly, in some embodiments, the computer system/server 12 may obtain a catalogue hierarchy of the target document 402. The catalogue hierarchy may indicate respective sections of the target document 402 and may indicate relative locations of the respective sections within the target document 402. The relative locations of the respective sections may be indicated by the number of the respective beginning page of the sections. The respective sections of the target documents 402 may be indicated by the titles of the sections presented in the target document 402. According to the catalogue hierarchy, a parent index may indicate a high-level section that includes a low-level section indicated by a child or leaf index.

The catalogue hierarchy may be created and presented in the target document 402, for example, in a catalogue page which lists all the titles of the sections discussed in the document along with the pages where the sections begin. In some embodiments, if no such catalogue hierarchy exists in the target document 402, the computer system/server 12 may analyze the hierarchical structure of the sections included in the target document 402 and may itself create a catalogue hierarchy.

From the catalogue hierarchy of the target document 402, the computer system/server 12 may extract a part of the catalogue hierarchy that indexes the target portion and may include it with the mapping 452 of the target portion. As a result, the mapping 452 may include marker information, identification information, the relative location, and the catalogue hierarchy The extracted part may traverse from a top index to an index indicating the section that includes the target portion. The top index may be at a root level of the catalogue hierarchy. The extracted part of the catalogue hierarchy may include all the parent indices of the child index indicating the section that includes the target portion.

Figure 6:
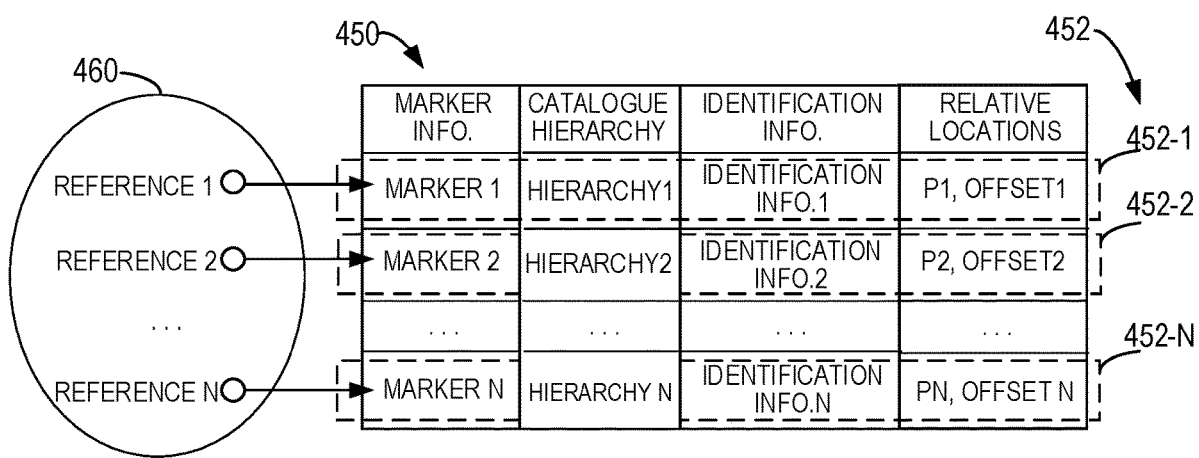
FIG. 6 depicts a further example of the mapping for document reference according to some embodiments of the present disclosure.

In the example shown in FIG. 5, a catalogue hierarchy 505 of the target document 402 is illustrated, and the target portion 510 is found in Section V(1), e.g., in Section 5(1). The parts 540 of the catalogue hierarchy 505 may be extracted to index the target portion 510. Those parts 540 include all the parent indices of the index indicating the section that includes the target portion 510. FIG. 6 shows a further example of the mapping 452 in the table 450. As shown, each mapping 452 further includes a catalogue hierarchy part to indicate the part of the catalogue hierarchy that indexes the target portion, represented as "Hierarchy1," "Hierarchy2," . . . , "Hierarchy N."

To better understand the mapping 452 generated for the target portion of the target document 402, FIG. 7 shows an example table 450 that includes mappings 452 of marker information, catalogue hierarchies, identification information, and relative locations of respective target portions. The example table 450 is created from the example target document 402 shown in FIG. 5. In FIG. 7, identification information in a mapping 452 is elaborated as a collection 710 of an identifier, a content, a content hash value, and a context hash value. The example mapping 452-1 in FIG. 7 is generated for the portion 510 in the example target document 402 of FIG. 5 in the case that portion 510 is specified as a target portion. The example mapping 452-2 in FIG. 7 is generated for the portion 530 in the example target document 402 of FIG. 5 in the case that portion 530 is also specified as a target portion, and the mapping 452-N in FIG. 7 is generated for the section with the title presented in the portion 520 in the example target document 402 of FIG. 5.

As mentioned above, to reference the target portion of the target document 402, a reference to the target portion is mapped to the marker information of the target portion. The marker information is generally static. For example, as shown in FIG. 4 or FIG. 6, a reference in the reference source 460, which is represented as "Reference 1," is mapped or pointed to marker information "Marker 1" in the mapping 452-1. Other references "Reference 2," . . . "Reference N" are also mapped or pointed to corresponding marker information "Marker 2," . . . "Marker N." Although one reference source is illustrated, references from more than one reference source may be mapped to the marker information in the generated mapping(s).

A reference in the reference source 460 may include a link 480 such as a hyperlink or an anchor to the target portion of the target document 402. FIG. 4 shows an example of a link 480. Thus, by clicking or otherwise selecting the hyperlink or anchor, the user may be navigated to the target portion of the target document 402. In some embodiments, an access address of the target document may also be used, in addition to the marker information, to define the link in order to reference the target portion of the target document 402. The reference or the link may be defined in any other manner as long as the link is mapped to the marker information. The scope of the present invention is not limited in this regard.

In some embodiments, the mapping 452 for the target portion may be stored as metadata of the target document for use in referencing the target portion of the target document.

For example, the metadata could be stored in ram 30 of the memory 28 or in some other memory. In some embodiments, the stored mapping 452 may be used to direct the reference to the target portion in the target document. Specifically, if it is detected that the reference to the target portion is live or enabled at the reference source, the link 480 to the target portion is caused to be directed to the relative location, or to an updated relative location as described below, of the target portion according to the stored mapping 452. The directing of the link 480 may be implemented by the computer system/server 12. In some examples, the mapping 452 for the target portion may be obtained by a different computer system/server to implement the reference to the target portion.

According to some embodiments of the present disclosure, the mapping 452 for the target portion is determined and provided for the target document 402 and for the reference source 460 so that the change to the target document 402 is isolated from the document reference. In other words, in some embodiments the document reference may be maintained despite changes to the target document. Without the advantages of the present disclosure, changes to the target document may require the reference source to be manually updated in order to provide a correct reference. Manual updates may be required because the target document change and the document reference are linked and not isolated from each other, when embodiments of the present disclosure are not implemented. With a separate mapping according to embodiments of the present disclosure, the reference to the target portion can be easily achieved and the reference update may also be implemented in an automatic way by updating the mapping, without changing the reference or without requiring manual review of the document changes. Thus, the method may include using a virtual layer, e.g., the mappings and/or the virtual marker table and/or an index and clip tree, to isolate the reference from changes to the original document, e.g., the target document. In other words, the correct reference by the reference source is automatically maintained despite changes to the target document.

In some cases, the target document 402 may be updated, for example, by adding and/or deleting content, adjusting arrangement of the content, and/or the like. In some embodiments, the computer system/server 12 may monitor a source of the target document 402 periodically, to detect whether the target document 402 has been updated since it was last visited. In some embodiments, the computer system/server 12 may be informed of an event indicating an update to the target document 402.

If it is detected that the target document 402 is updated, for example, to be an updated document, the computer system/server 12 may decide whether a relative location of the target portion in the target document 402 has changed in the updated document, and may determine whether the mapping 452 needs to be updated so as to ensure that the previously created reference may still be linked to the correct location in the updated document.

Figure 8:
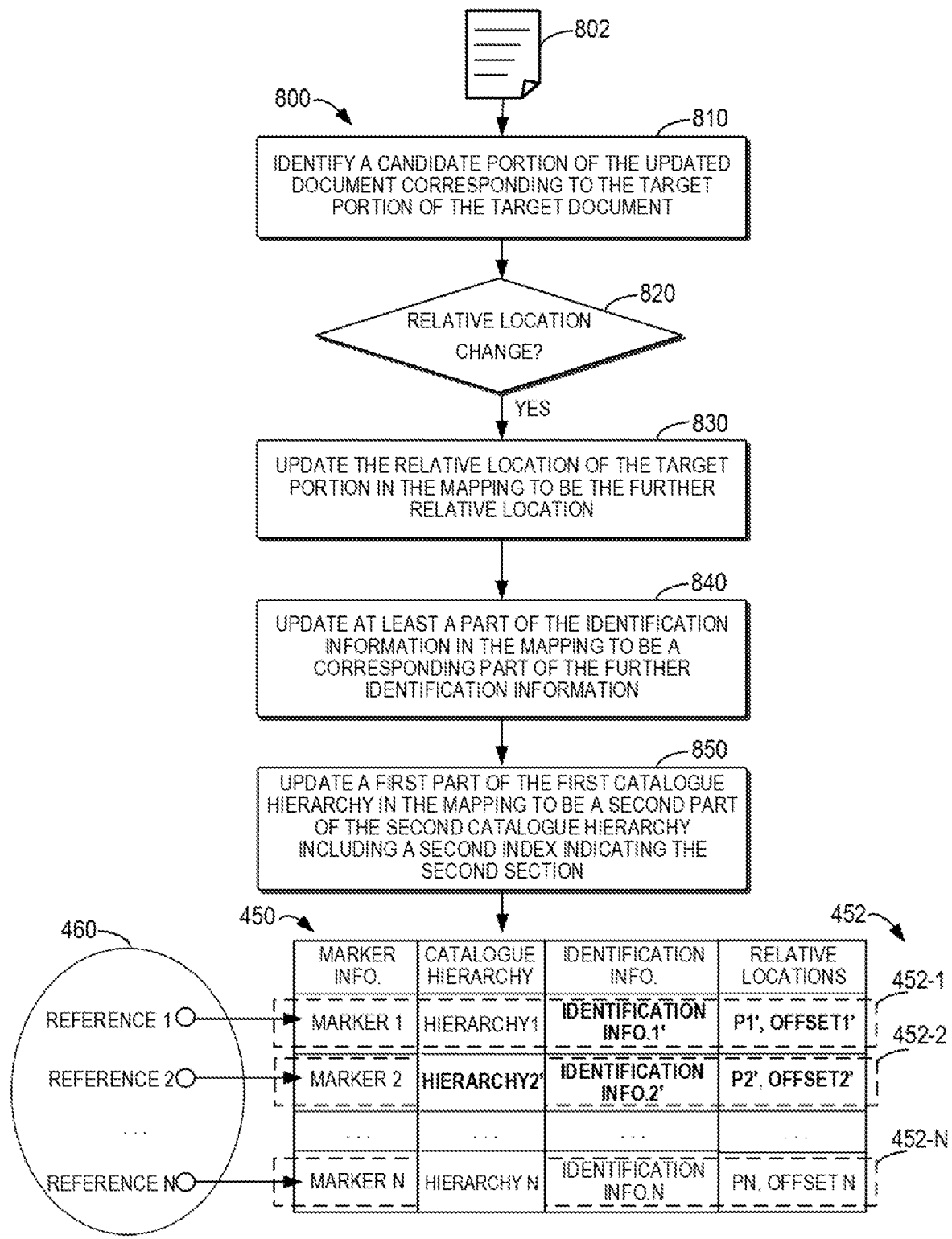
FIG. 8 depicts a flowchart of a process for reference update according to some embodiments of the present disclosure.

FIG. 8 shows a flowchart of a process 800 for reference update according to some embodiments of the present disclosure. The process 800 can be implemented by any computer system, such as the computer system/server 12 discussed above with reference to FIG. 1, to implement the reference update. For the purpose of discussion, the process 800 will be described with reference to FIG. 1.

The process 800 is implemented to update a mapping 452 in the case that an updated document 802 for the target document 402 is detected. The updated document 802 may include one or more changes as compared with the target document 402. It is to be noted that for the purpose of discussion, the process 800 is described as updating a mapping 452 for use in referencing one target portion. The mappings 452 for any other target portions of the target document 402, if any, may also be updated in a similar manner.

Specifically, at block 810, the computer system/server 12 identifies a candidate portion of the updated document 802 corresponding to the target portion of the target document 402. Due to the change(s) made in the updated document 802, content and/or a relative location of the target portion may have changed in the updated document 802 relative to the target document 402.

To determine whether or not to update the relative location in the mapping, a portion of the updated document 802 that corresponds to the target portion needs to be determined or identified. One possible way to find the corresponding candidate portion in the updated document 802 is to compare the updated document 802 and the target document 402. If one portion of the updated document 802 is found to be similar to the target portion of the target document 402, that portion of the updated document 802 may be determined as a candidate portion.

In some embodiments, catalogue hierarchies of the documents may be used to facilitate the localizing of the candidate portion, because the catalogue hierarchies can reflect the overall structure information of the documents. In particular, the computer system/server 12 may obtain a catalogue hierarchy of the target document 402 (referred to as a first catalogue hierarchy for the purpose of discussion) and may obtain a catalogue hierarchy of the updated document 802 (referred to as a second catalogue hierarchy for the purpose of discussion). An example of the first catalogue hierarchy of the target document 402 may be the catalogue hierarchy 505 in FIG. 5. As introduced above, a catalogue hierarchy of a document may include respective sections of the document in a hierarchy structure and relative locations of the respective sections within the document.

The computer system/server 12 may compare the first catalogue hierarchy and the second catalogue hierarchy in order to identify a section of the updated document 802 that includes the candidate portion. In the following, for the purpose of discussion, a section of the target document 402 that includes the target portion is referred to as a first section of the target document 402, and a section of the updated document 802 that includes the candidate portion is referred to as a second portion of the updated document 802. The first section is indicated by a first index in the first catalogue hierarchy of the target document 402. The second section is indicated by a second index in the second catalogue hierarchy of the updated document 802.

In some embodiments, if the first catalogue hierarchy and the second catalogue hierarchy are the same in hierarchical structure but are different in relative locations of the sections, it means that no index is added or deleted from the target document 402 to form the updated document 802, and that the hierarchical levels of all the indices remain unchanged. The changes of the relative locations of the sections may be caused by content having been added into or content having been deleted from one or more sections, resulting in the titles of the sections being moved. In this case, the second index can be identified at the same hierarchical level in the second catalogue hierarchy as the first index in the first catalogue hierarchy. The second index may correspond to a different relative location from the relative location of the first index in the target document 402.

In some embodiments, if the first catalogue hierarchy and the second catalogue hierarchy are different from each other in hierarchical structure, the computer system/server 12 may determine or identify the second index in the second catalogue hierarchy by comparing the indices. The changes in hierarchical structure may have been caused by one or more sections being added or deleted or the order of some sections of the target document 402 being adjusted to form the updated document 802. The changes to the sections may lead to changes of the indices in hierarchical structure.

Figure 9A:
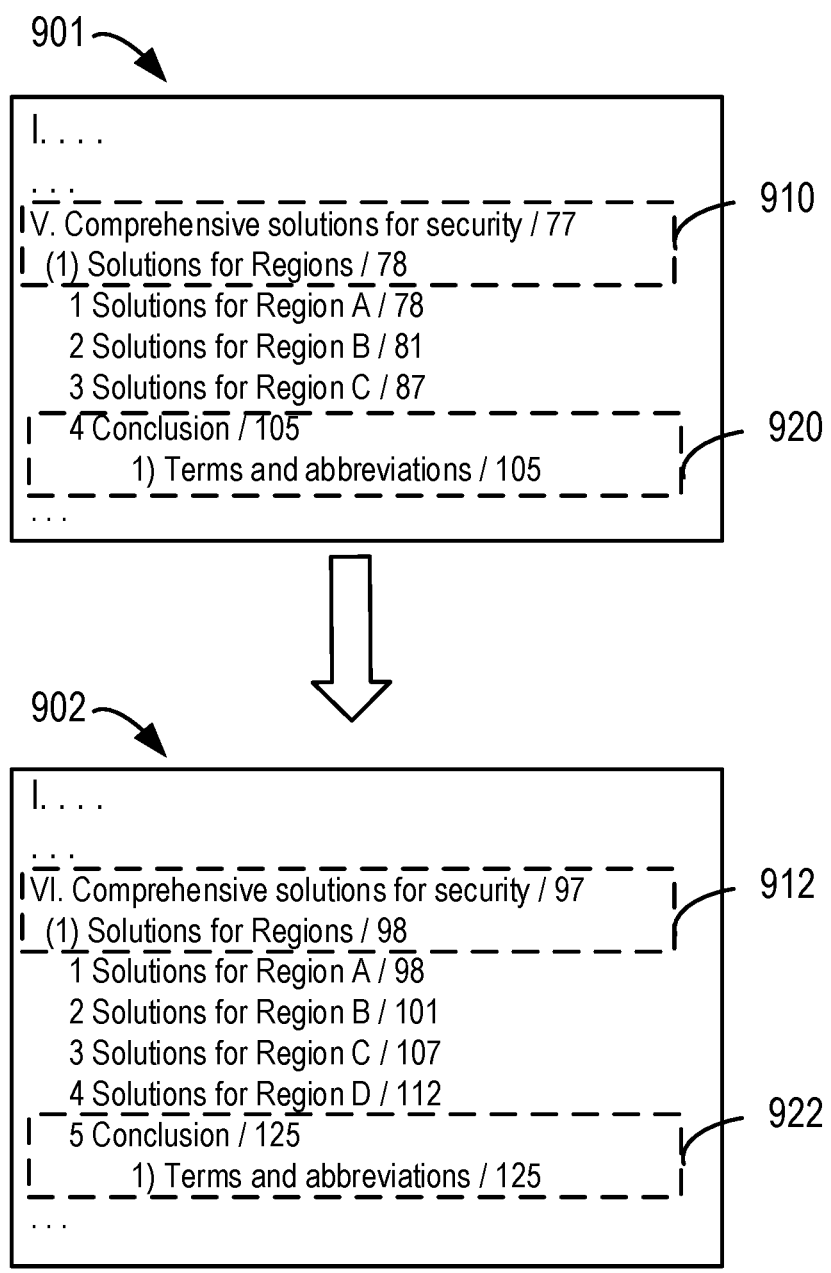
FIG. 9A depicts an example of changes in a document that lead to changes of the indices in hierarchical structure according to some embodiments of the present disclosure.

FIG. 9A shows such an example. By comparing an example first catalogue hierarchy 901 and an example second catalogue hierarchy 902, it can be determined that an index 910 indicating Section V in the first catalogue hierarchy 901 is changed to an index 912 indicating Section VI in the second catalogue hierarchy 902 and similarly, that indices 920 are changed to indices 922. If the first section includes the target portion indexed by the title "1) Terms and abbreviations" at page 105, the same title "1) Terms and abbreviations" at page 125 can be detected from the second catalogue hierarchy 902 by comparing the titles. The corresponding section indexed by this title and the new relative location "page 125" can be determined accordingly. In some examples, upon comparison of the two indices (such as the titles), if their similarity exceeds a predetermined threshold, it is determined that the two indices are the same or similar.

In some embodiments, during comparison of the first catalogue hierarchy and the second catalogue hierarchy, if no corresponding second index can be found from the second catalogue hierarchy, it indicates that the first section that includes the target portion may have been deleted from the updated document 802. In this case, user confirmation may be involved or needed. Otherwise, if the second section in the updated document 802 can be determined or identified, the candidate portion may be localized from the updated document 802 based on a relative location of the second section in the updated document.

In some embodiments, the computer system/server 12 may localize the second section based on its relative location and may compare the second section with the corresponding target portion of the target document 402. As such, a same or similar portion from the second section may be identified as the candidate portion.

With the candidate portion now localized in the updated document 802, next at block 820 the computer system/server 12 determines whether a further relative location of the candidate portion within the updated document 802 is different from the relative location of the target portion within the target document 402.

Many types of changes to the target portion or other portions of the target document 402 may lead to a change of the relative location in the updated document 802. In some embodiments, the computer system/server 12 may compare the identification information recorded in the mapping 452 for the target document 402 with further identification information of the candidate portion of the updated document 802.

The further identification information of the candidate portion may be determined in a similar way as the identification information for the target portion in the target document 402 was determined. For example, the further identification information may include one or more of an identifier of the candidate portion, at least a part of the content in the candidate portion, a content hash value determined from at least a part of the content in the candidate portion, and a context hash value determined from the context information for the candidate portion in the updated document 802.

If any part of the further identification information is determined to be different from a corresponding part of the identification information of the target portion, this indicates that one or more changes may have been made to the target portion or the target document 402 and that, in result, a change of the relative location of the target portion would have occurred. For example, if one or more of the identifiers, the content hash values, and/or the context hash values in the identification information of the target portion and the candidate portion are found to be different, the computer system/server 12 may determine that the further relative location of the candidate portion may be different from the relative location of the target portion.

FIG. 9B shows an example of a change of the relative location. In this example, the target document 402 has its target portion included in an introduction section 930, while the updated document 802 also has the candidate portion included in the introduction section 930. The content of a target portion 950 referenced by a reference source remains unchanged in the updated document 802. Accordingly, the content hash values determined for the target portion and for the candidate portion remain unchanged. However, the context information in portions 940, 960 of the target portion is changed to different context information in portions 942, 962, resulting in a change of the context hash values. Thus, the relative location 972 (for example, page "05") of the candidate portion may be different from the relative location 970 (for example, page "03") of the target portion.

FIG. 9C shows another example of a change of the relative location. In this example, the target document 402 has its target portion included in an introduction section 930, while the updated document 802 also has the candidate portion included in the introduction section 930. In this example, the context information in portions 940, 960 remains unchanged, but content in the target portion 950 has been changed to different content in the candidate portion 952. Thus, the context hash values for the target portion and the candidate portion are the same, but the content hash values change. As a result, the relative location 972 of the candidate portion may be different from the relative location 970 of the target portion.

In some embodiments, if the content hash values are determined to be different and the identifiers and the context hash values are determined to be unchanged or changed, the computer system/server 12 may further determine whether the change rate or the change amount of the content in the target portion and the candidate portion exceeds a certain threshold. If the change rate or change amount exceeds a threshold, which may indicate that large changes have been made to the content in the second portion as compared to the first portion, then the computer system/server 12 may determine that the relative location of the candidate portion may be different from the relative location of the target portion.

If the further relative location of the candidate portion is different from the relative location of the target portion within the target document 402, at block 830 the computer system/server 12 updates the relative location of the target portion in the mapping 452 to be the further relative location. The marker information in the mapping 452 remains unchanged such that the reference in the reference source 460 can still be mapped to the same marker information. By updating the relative location in the mapping 452, the reference in the reference source 460 can still be linked to the correct portion in the updated document 802.

In some embodiments, if the computer system/server 12 determines that all of the identification information of the target portion is different from the further identification information of the candidate portion, manual review and checking may be involved or needed to link the reference to the desired portion in the updated document 802.

In some embodiments, if it is determined that a part of the further identification information is different from a corresponding part of the identification information, at block 840 the computer system/server 12 may further update the corresponding part of the identification information in the mapping 452 to be the new part of the further identification information for the candidate portion in the updated document 802. For example, if any one or more of the identifiers, the content hash value, and/or the context hash value in the identification information of the target portion and the candidate portion are different, the computer system/server 12 may update the same part of the identification information in the mapping 452.

In some embodiments, if the first index in the first catalogue hierarchy indicating the first section that includes the target portion is different from a second index in the second catalogue hierarchy indicating the second section, at block 850 the computer system/server 12 may update the first part of the first catalogue hierarchy in the mapping to be a second part of the second catalogue hierarchy indexing the candidate portion. The first index may be different from the second index in their titles and/or their hierarchical levels in the corresponding catalogue hierarchies. The first part is updated according to the second part in order to index the correct second section that includes the updated candidate portion and the relative location of this second section in the updated document 802.

FIG. 8 further illustrates the table 450 with the mappings 452-1 and 452-2 updated. In particular, the relative location and the identification information in the mapping 452-1 for a target portion are changed. The catalogue hierarchy as well as the relative location and the identification information in the mapping 452-2 for another target portion are changed. The updated relative locations can be used to direct the references in the reference source 460 to the correct portions of the updated document 802, and the updated catalogue hierarchy and the identification information can be used to facilitate a localizing of the corresponding portion in any subsequent updated versions of the document.

While operations of the processes are depicted in a particular order, it should not be understood as requiring that such operations are performed in the particular order as shown in a sequential order, or that all illustrated operations be performed, to achieve desirable results. In certain circumstances, multitasking and parallel processing may be advantageous. For example, the operations at blocks 410 and 420 of the process 400 or the operations at blocks 830-850 may be performed in a reverse order or in parallel.

It should be noted that the processing of document reference and reference update according to embodiments of this disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   assigning, by one or more processors, marker information for a reference of a reference source, the reference referencing a target portion of a target document;
   determining, by the one or more processors, identification information for the target portion, wherein the determined identification information is based on content in the target portion and context information for the target portion in the target document, the context information comprising content of another portion of the target document;
   obtaining, by the one or more processors, a first catalogue hierarchy of the target document, the first catalogue hierarchy being presented in a catalogue page of the target document and indicating sections of the target document;
   generating, by the one or more processors, a mapping of at least the marker information, the identification information, a relative location of the target portion within the target document, and a first index from the first catalogue hierarchy for use in the referencing of the target portion by the reference source, wherein the relative location is based on the catalogue hierarchy of the target document, and the target portion is disposed within a first section that is indexed by the first index;
   updating, by the one or more processors, the generated mapping based on a determination by the one or more processors that other information of the target document not including the target portion has changed;
   obtaining a second catalogue hierarchy from an updated document, the first and the second catalogue hierarchies each comprising indices indicating respective sections of the target document and of the updated document; and
   comparing the first catalogue hierarchy and the second catalogue hierarchy to determine a second index from the second catalogue hierarchy that corresponds to the first index;
   wherein:
   in response to the first index being equal to the second index, the updating of the generated mapping includes changes to the relative location and not to the first index or
   in response to the first index being different from the second index, the updating of the generated mapping includes changes to the relative location and changing the first index to be the second index.

2. The method of claim 1, wherein the determination that other information of the target document not including the target portion has changed further comprises:
   detecting, by the one or more processors, that the target document is updated to be an updated document;
   identifying, by the one or more processors, a candidate portion of the updated document corresponding to the target portion of the target document; and
   determining, by the one or more processors, whether a further relative location of the candidate portion within the updated document is different from the relative location of the target portion within the target document; and
   wherein the updating the generated mapping comprises, in response to determining that the further relative location is different from the relative location, updating, by the one or more processors, the relative location of the target portion in the mapping to include the further relative location, without changing the marker information.

3. The method of claim 2, wherein the determining whether the further relative location is different from the relative location further comprises:
   determining, by the one or more processors, further identification information for the candidate portion based on content in the candidate portion and based on context information for the candidate portion in the updated document;
   comparing, by the one or more processors, the further identification information for the candidate portion with the identification information for the target portion; and
   in response to determining that a part of the further identification information is different from a corresponding part of the identification information, determining, by the one or more processors, that the further relative location is different from the relative location.

4. The method of claim 1, wherein the identification information further comprises at least one member selected from the group consisting of: an identifier of the target portion, a content hash value determined from the content in the target portion, and a context hash value determined from the context information for the target portion.

5. The method of claim 3, further comprising:
   in response to determining that a part of the further identification information is different from the corresponding part of the identification information, updating, by the one or more processors, the corresponding part of the identification information in the mapping to be the part of the further identification information.

6. The method of claim 2,
   wherein the first and the second catalogue hierarchies each comprise indices indicating relative locations of the respective sections within the target document and within the updated document, the target portion being in a first section of the target document indicated by the first index;
   wherein identifying the candidate portion of the updated document further comprises:
      determining, by the one or more processors, a second section of the updated document comprising the candidate portion by comparing the first catalogue hierarchy and the second catalogue hierarchy; and
      localizing, by the one or more processors, the candidate portion from the updated document based on a relative location of the second section in the updated document.

7. The method of claim 6, wherein determining the second section further comprises:
   determining, by the one or more processors, the second section of the updated document by comparing the target document and the updated document.

8. The method of claim 1, further comprising:
   storing, by the one or more processors, the generated mapping as metadata associated with the target document.

9. The method of claim 1, further comprising:
   identifying, by the one or more processors, a candidate portion of a second document, the candidate portion corresponding to the target portion of the target document;
   determining, by the one or more processors, further identification information for the candidate portion based on content in the candidate portion and based on context information for the candidate portion in the second document;
   comparing, by the one or more processors, the further identification information for the candidate portion with the identification information for the target portion; and
   in response to determining that a part of the further identification information is different from a corresponding part of the identification information, determining, by the one or more processors, that a further relative location of the candidate portion in the second document is different from the relative location;
   wherein the updating of the generated mapping updates the relative location to be the further relative location.

10. The method of claim 1, wherein the target portion comprises a special content object having a number, and wherein the identification information further comprises a type of the special content object and the number of the special content object.

11. The method of claim 1, wherein the identification information further comprises a content hash value determined from the at least one part of the content in the target portion, and wherein the content hash value is calculated based on extracted text from the target portion and on one or more binary representations representing non-textual information from the target portion.

12. The method of claim 1, wherein the identification information further comprises a binary representation representing non-textual information from the target portion.

13. The method of claim 1, wherein the identification information further comprises a context hash value determined from the at least one part of the context of the target document, and wherein the context hash value is calculated based on extracted text from the context and on one or more binary representations representing non-textual information from the context.

14. The method of claim 1, wherein the generated mapping is part of a virtual layer such that, in response to the updating of the generated mapping, no update to the reference in the reference source is made, and wherein the method further comprises establishing a link between the virtual layer and the reference of the reference source.

15. The method of claim 1, wherein the method further comprises:
   obtaining a third catalogue hierarchy from a further updated document, the third catalogue hierarchy comprising indices indicating respective sections of the further updated document;
   comparing at least one of the first catalogue hierarchy and the second catalogue hierarchy to the third catalogue hierarchy; and
   in response to the comparison finding no index of the third catalogue hierarchy that corresponds to the first index or to the second index, requesting user review of the reference and the updated document.

16. A computer system for document reference and reference update, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
      assigning marker information for a reference of a reference source, the reference referencing a target portion of a target document;

determining identification information for the target portion, wherein the determined identification information is based on content in the target portion and context information for the target portion in the target document, the context information comprising content of another portion of the target document;

obtaining a first catalogue hierarchy of the target document, the first catalogue hierarchy being presented in a catalogue page of the target document and indicating sections of the target document;

generating a mapping of at least the marker information, the identification information, a relative location of the target portion within the target document, and a first index from the first catalogue hierarchy for use in the referencing of the target portion by the reference source, wherein the relative location is based on the catalogue hierarchy of the target document and the target portion is disposed within a first section that is indexed by the first index;

updating, by the one or more processors, the generated mapping based on a determination by the one or more processors that other information of the target document not including the target portion has changed;

obtaining a second catalogue hierarchy from an updated document, the first and the second catalogue hierarchies each comprising indices indicating respective sections of the target document and of the updated document; and comparing the first catalogue hierarchy and the second catalogue hierarchy to determine a second index from the second catalogue hierarchy that corresponds to the first index;

wherein:
in response to the first index being equal to the second index, the updating of the generated mapping includes changes to the relative location and not to the first index or
in response to the first index being different from the second index, the updating of the generated mapping includes changes to the relative location and changing the first index to be the second index.

17. The computer system of claim 16, wherein the identification information further comprises at least one member selected from the group consisting of: an identifier of the target portion, a content hash value determined from the content in the target portion, and a context hash value determined from the context information for the target portion.

18. The computer system of claim 16, wherein the generated mapping is part of a virtual layer such that, in response to the updating of the generated mapping, no update to the reference in the reference source is made, and wherein the method further comprises establishing a link between the virtual layer and the reference of the reference source.

19. A computer program product for document reference and reference update, the computer program product comprising a computer-readable storage media having program instructions embodied therewith, the program instructions being executable by a processor to cause the processor to perform a method comprising:

assigning marker information for a reference of a reference source, the reference referencing a target portion of a target document;

determining identification information for the target portion, wherein the determined identification information is based on content in the target portion and context information for the target portion in the target document, the context information comprising content of another portion of the target document;

obtaining a first catalogue hierarchy of the target document, the first catalogue hierarchy being presented in a catalogue page of the target document and indicating sections of the target document;

generating a mapping of at least the marker information, the identification information, a relative location of the target portion within the target document;

and a first index from the first catalogue hierarchy for use in the referencing of the target portion by the reference source, wherein the relative location is based on the catalogue hierarchy of the target document and the target portion is disposed within a first section that is indexed by the first index;

updating the generated mapping based on a determination that other information of the target document not including the target portion has changed;

obtaining a second catalogue hierarchy from an updated document, the first and the second catalogue hierarchies each comprising indices indicating respective sections of the target document and of the updated document; and comparing the first catalogue hierarchy and the second catalogue hierarchy to determine a second index from the second catalogue hierarchy that corresponds to the first index;

wherein:
in response to the first index being equal to the second index, the updating of the generated mapping includes changes to the relative location and not to the first index or
in response to the first index being different from the second index, the updating of the generated mapping includes changes to the relative location and changing the first index to be the second index.

20. The computer program product of claim 19, wherein the identification information further comprises at least one member selected from the group consisting of: an identifier of the target portion, a content hash value determined from the content in the target portion, and a context hash value determined from the context information for the target portion.

* * * * *